United States Patent
Manjanatha et al.

(10) Patent No.: US 12,450,304 B1
(45) Date of Patent: Oct. 21, 2025

(54) CONTROLLING ACCESS TO DATA USING A URL ASSOCIATED WITH A QUERY

(71) Applicant: Oracle International Corporation, Redwood Shores, CA (US)

(72) Inventors: Sowmya Manjanatha, Westford, MA (US); Kevin Scott Canuette Grimaldi, Acton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 19 days.

(21) Appl. No.: 18/629,798

(22) Filed: Apr. 8, 2024

(51) Int. Cl.
*G06F 16/955* (2019.01)
*H04L 9/40* (2022.01)

(52) U.S. Cl.
CPC .......... *G06F 16/9566* (2019.01); *H04L 63/10* (2013.01)

(58) Field of Classification Search
CPC .............................. G06F 16/9566; H04L 63/10
See application file for complete search history.

(56) References Cited

PUBLICATIONS

Google Cloud Community. "how to share a SQL query?". Posted Sep. 19, 2021. Available as early as Oct. 6, 2023. https://www.googlecloudcommunity.com/gc/The-Kitchen-Table/how-to-share-a-SQL-query/td-p/589481 (4 pages).
Microsoft Learn. Share queries from Azure Data Explorer web UI. Posted May 28, 2023. Version accessed on Jul. 10, 2024. Available as early as Oct. 6, 2023. Available online at https://learn.microsoft.com/en-us/azure/data-explorer/web-share-queries (6 pages).
Microsoft Support. Create a Shareable Link. Version dated Jul. 10, 2024. Available as early as Oct. 6, 2023. https://support.microsoft.com/en-au/office/create-a-shareable-link-8257f6da-d5db-4207-a654-925644e3f35c (3 pages).
POPSQL. Changing Permissions. Version dated Jul. 12, 2024. Available as early as Oct. 6, 2023. Available online at https://docs.popsql.com/docs/changing-query-permissions (4 pages).
POPSQL. Sharing a Link to Your Query and Results. Version dated Jul. 12, 2024. Available as early as Oct. 6, 2023. Available online at https://docs.popsql.com/docs/sharing-a-link-to-your-query-and-results (6 pages).
Stack Overflow. Sharing Links with Query Strings. Last modified Jun. 1, 2020. Version accessed on Jul. 10, 2024. Available as early as Oct. 6, 2023. Available online at https://stackoverflow.com/questions/55048726/sharing-links-with-query-strings (4 pages).

*Primary Examiner* — David R Lazaro
(74) *Attorney, Agent, or Firm* — Invoke

(57) ABSTRACT

A system for controlling access to data. The system includes an electronic processor configured to receive, from a first computing device, a first resource request using a uniform resource locator (URL) and identify a first data record, from a plurality of data records, corresponding to the URL. The electronic processor is also configured to identify, from the first data record, a first resource and a first user and verify access rights of the first user identified from the first data record to the first resource identified from the first data record. The electronic processor is further configured to, in response to verifying the access rights of the first user to the first resource, execute a first query identified from the first data record on the first resource to generate a first set of query results and transmit, to the first computing device, the first set of query results.

19 Claims, 12 Drawing Sheets

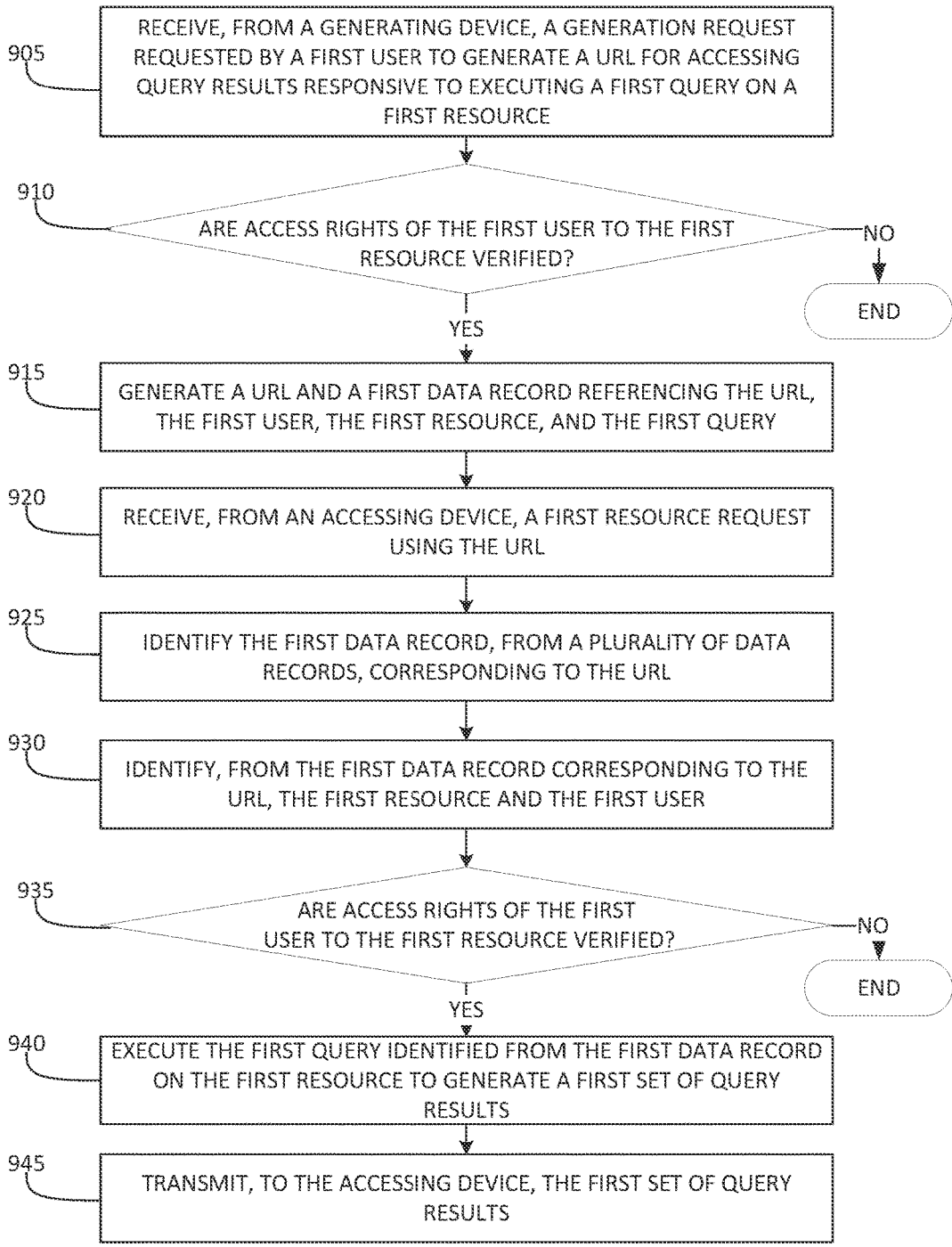

CONTROLLING ACCESS TO DATA USING A URL ASSOCIATED WITH A QUERY

FIELD

Embodiments described herein relate to controlling access to data included in a cloud-based object storage system using a uniform resource locator (URLs) associated with a query.

SUMMARY

A data resource stored in a cloud-based object storage system may include confidential or otherwise restricted information. Access controls implemented by the storage system may restrict access to the data resource based on an identity of a user requesting access. Accordingly, in a situation where a portion of the data resource needs to be accessed by a user not currently authorized to access the data resource, a separate data resource may be created including the desired portion of the original data resource, wherein the user is granted access to this separate data resource. This solution wastes computing resources (e.g., data storage resources) as data is duplicated between the original data resource and the separate data resource.

Embodiments described herein address this and other issues with current data storage and access control systems. For example, some embodiments described herein allow a first user to generate a URL associated with a query to be applied to a data resource that can be shared with a second user. The query can be designed by the first user to filter out information included in the data resource that the first user does not want the second user to be able to access. For example, through the query, users with access rights to a particular data resource may create rules that restrict access to certain rows, columns, or both included in the data resource while still providing another user (who does not have access rights to the data resource) access to needed data. The URL may be a sharable link that is pre-authenticated by a user with access rights to the data resource. In other words, the URL is associated with a first resource and a first user who had access rights to the first resource at the time that the URL was created. When a second user attempts to use the URL to access the first resource, the access rights of the first user, rather than the second user, are verified. In short, URLs including pre-authenticated sharable links give privileged users the ability to give data access to lesser-privileged users.

In some instances, the embodiments described herein allow privileged users to create multiple URLs each associated with a query restricting access to data included in a resource at a different level of restriction. For example, a first URL might be associated with a first query that, when executed on a first resource, returns all of the data included in the first resource except for the data included in one column, a second URL might be associated with a second query that, when executed on the first resource, returns all of the data included in the first resource except for the data included in several columns, and a third URL might be associated with a third query that, when executed on the first resource, returns all of the data included in the first resource except for the data included in several columns or included in record that contain specified data or values (e.g., customer names as one non-limiting example).

By associating a URL with a query, embodiments described herein improve access control over restricted data by, for example, providing a mechanism for sharing links to portions of stored data (e.g., controlled via queries) without requiring changes to existing data storage resources or the creation of new resources. Therefore, embodiments described herein allow the cost of storing one or more sanitized versions of a data resource, as well as the cost of the hardware and software required to create one or more new sanitized versions of the resource to be avoided.

One example embodiment provides a system for controlling access to data. The system includes at least one electronic processor. The electronic processor is configured to receive, from a first computing device, a first resource request using a uniform resource locator (URL) and identify a first data record, from a plurality of data records, corresponding to the URL. Each of the plurality of data records references a respective resource, a respective user, and a respective query. The electronic processor is also configured to identify, from the first data record corresponding to the URL, a first resource and a first user and verify access rights of the first user identified from the first data record to the first resource identified from the first data record. The electronic processor is further configured to, in response to verifying the access rights of the first user to the first resource, execute a first query identified from the first data record on the first resource to generate a first set of query results and transmit, to the first computing device, the first set of query results.

Another example embodiment provides a method for controlling access to data. The metho includes receiving, from a first computing device, a first resource request using a sharable link and identifying a first data record, from a plurality of data records, corresponding to the sharable link. Each of the plurality of data records references a respective resource, a respective user, and a respective query. The method further includes identifying, from the first data record corresponding to the sharable link, a first resource and a first user and verifying access rights of the first user identified from the first data record to the first resource identified from the first data record. The method also includes, in response to verifying the access rights of the first user to the first resource, executing a first query identified from the first data record on the first resource to generate a first set of query results and transmitting, to the first computing device, the first set of query results. Yet another example embodiment provides a non-transitory computer readable medium comprising executable instructions that, when executed by an electronic processor, cause the electronic processor to perform a set of functions. The set of functions include receiving, from a first computing device, a first resource request using a URL and identifying a first data record, from a plurality of data records, corresponding to the URL. Each of the plurality of data records references a respective resource, a respective user, and a respective query. The set of functions also include identifying, from the first data record corresponding to the URL, a first resource and a first user and verifying access rights of the first user identified from the first data record to the first resource identified from the first data record. The set of functions further include, in response to verifying the access rights of the first user to the first resource, executing a first query identified from the first data record on the first resource to generate a first set of query results and transmitting, to the first computing device, the first set of query results.

BRIEF DESCRIPTION OF THE DRAWINGS

FIG. 9 is a flowchart illustrating a method for controlling access to data, according to some embodiments.

DETAILED DESCRIPTION

Figure 1:
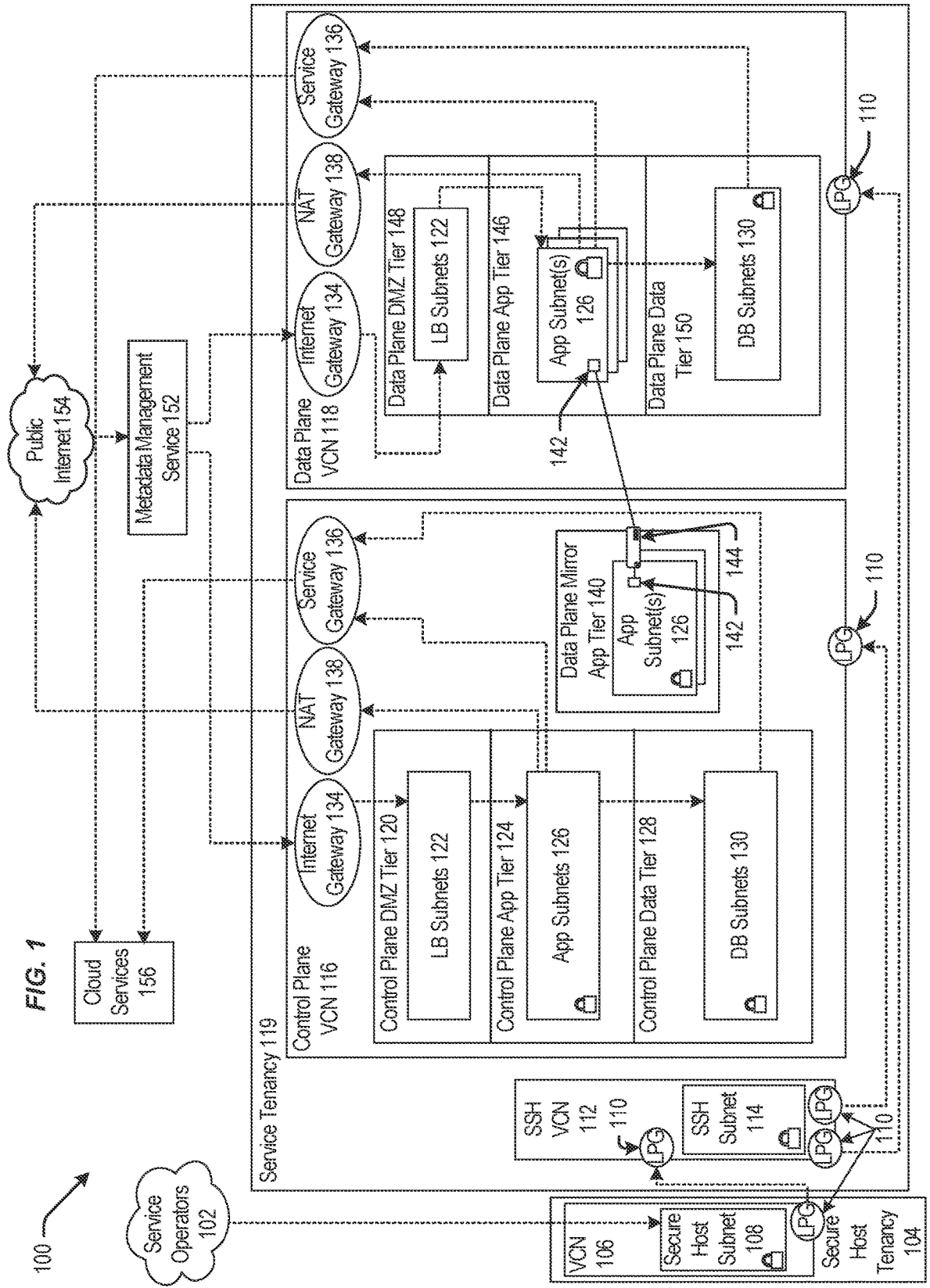
FIG. 1 is a block diagram illustrating one pattern for implementing a cloud infrastructure as a service system, according to at least one embodiment.

In the following description, various embodiments will be described. For purposes of explanation, specific configurations and details are set forth to provide a thorough understanding of the embodiments. However, it will be apparent to one skilled in the art that the embodiments may be practiced without the specific details. Furthermore, well-known features may be omitted or simplified to not obscure the embodiment being described.

Cloud-Based Computing Platforms

Embodiments described herein may performed, wholly or partly, within a cloud-based computing platform. Cloud-based computing platforms provide scalable and flexible computing resources for users. Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram 100 illustrating an example pattern of an IaaS architecture, according to at least one embodiment. Service operators 102 can be communicatively coupled to a secure host tenancy 104 that can include a virtual cloud network (VCN) 106 and a secure host subnet 108. In some examples, the service operators 102 may use one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively coupled to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s)

122 can transmit the request to app subnet(s) 126 contained in the control plane app tier 124. In response to the request being validated and requiring a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

Figure 2:
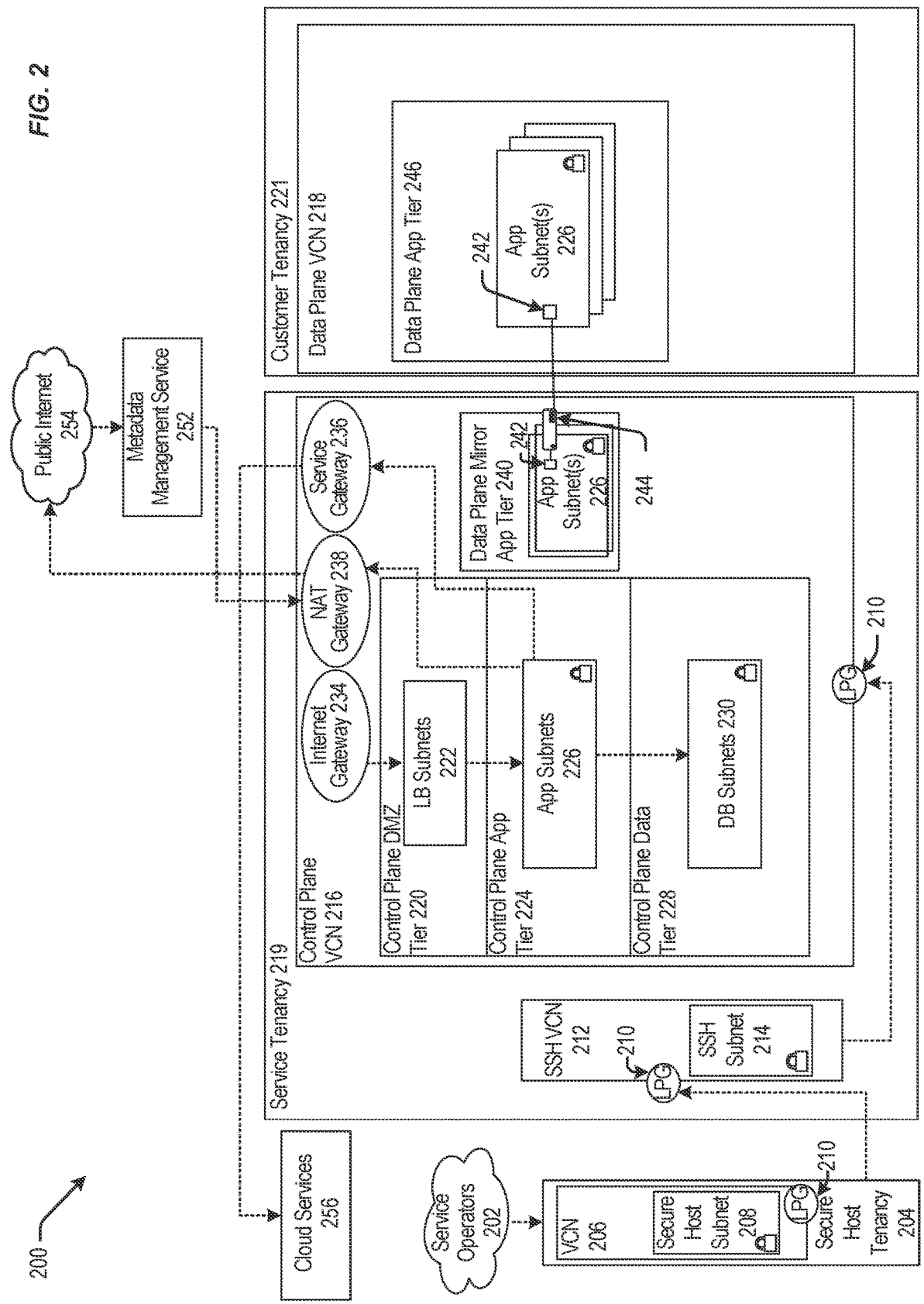
FIG. 2 is a block diagram illustrating another pattern for implementing a cloud infrastructure as a service system, according to at least one embodiment.

FIG. 2 is a block diagram 200 illustrating another example pattern of an IaaS architecture, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively coupled to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." In response to a call to Deployment 1 being made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
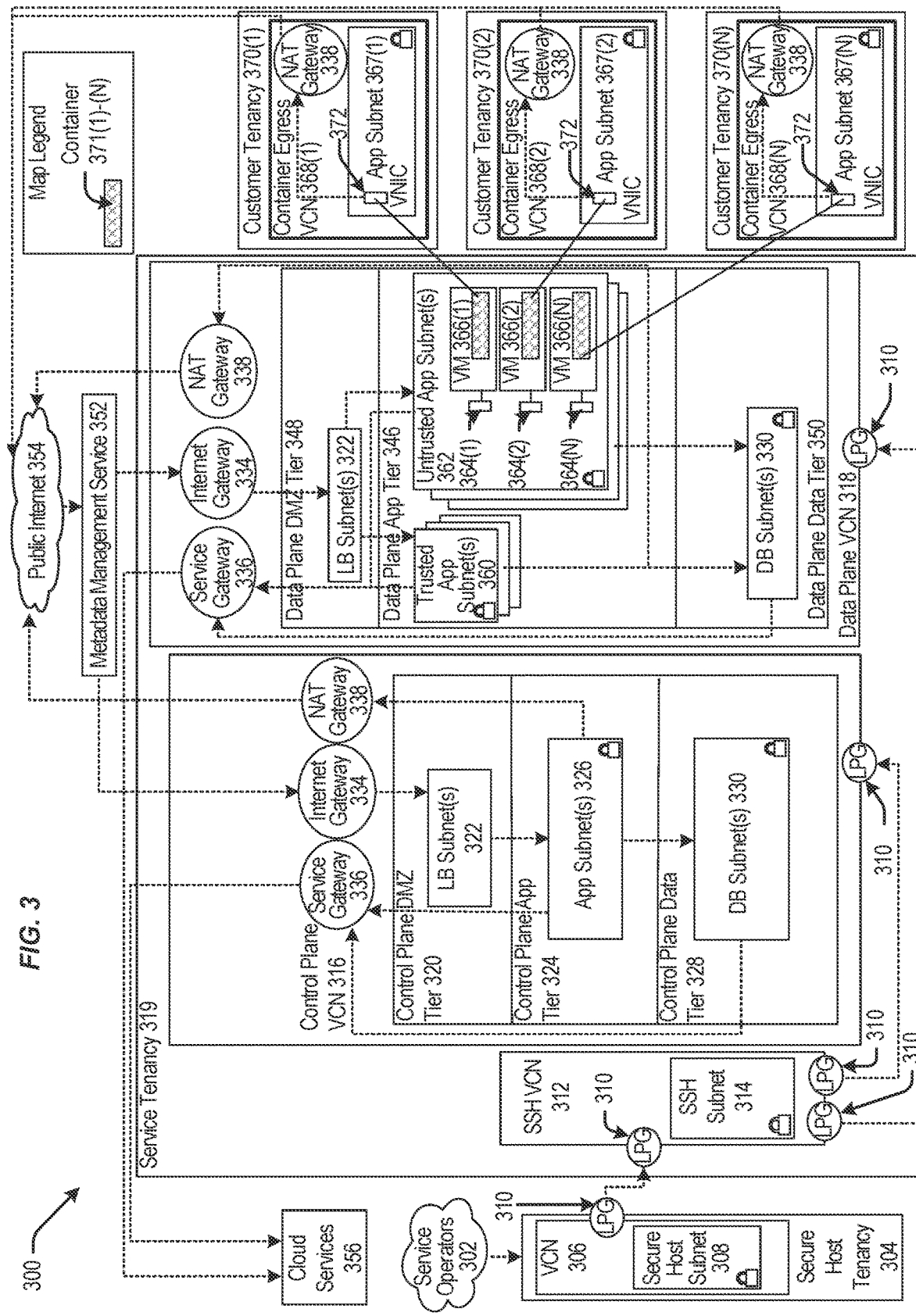
FIG. 3 is a block diagram illustrating another pattern for implementing a cloud infrastructure as a service system, according to at least one embodiment.

FIG. 3 is a block diagram 300 illustrating another example pattern of an IaaS architecture, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 370(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively coupled to cloud services 356.

In some embodiments, the data plane VCN 318 can be integrated with customer tenancies 370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 370. Respective containers 371(1)-(N) contained in the VMs 366(1)-(N) may be configured to run the code. In this case, there can be a dual isolation (e.g., the containers 371(1)-(N) running code, where the containers 371(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 371(1)-(N) may be communicatively coupled to the customer tenancy 370 and may be configured to transmit or receive data from the customer tenancy 370. The containers 371(1)-(N) may not be configured to transmit or receive data from any other entity in the data plane VCN 318. Upon completion of running the code, the IaaS provider may kill or otherwise dispose of the containers 371(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 371(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
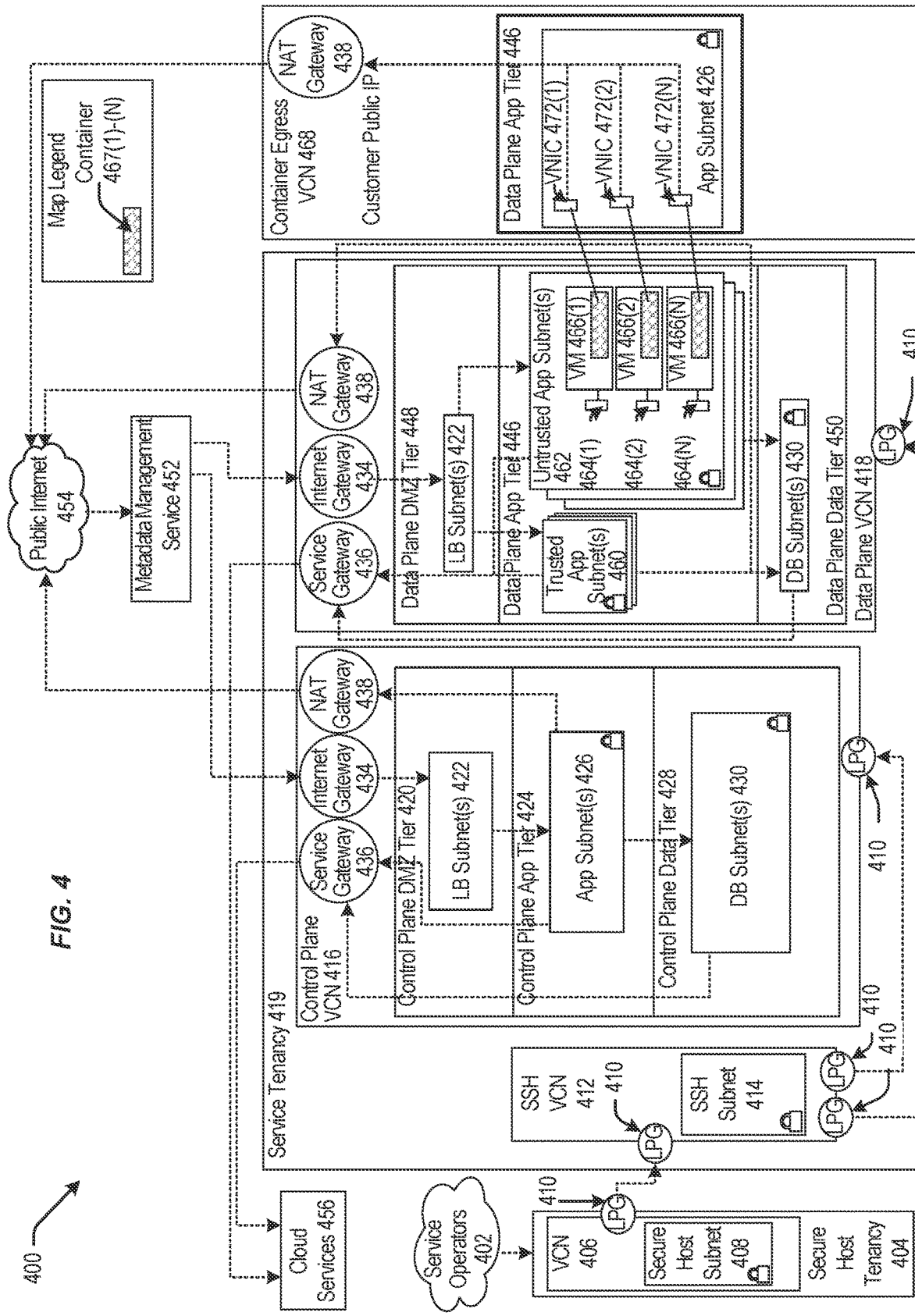
FIG. 4 is a block diagram illustrating another pattern for implementing a cloud infrastructure as a service system, according to at least one embodiment.

FIG. 4 is a block diagram 400 illustrating another example pattern of an IaaS architecture, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively coupled to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider when the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Computer System

Figure 5:
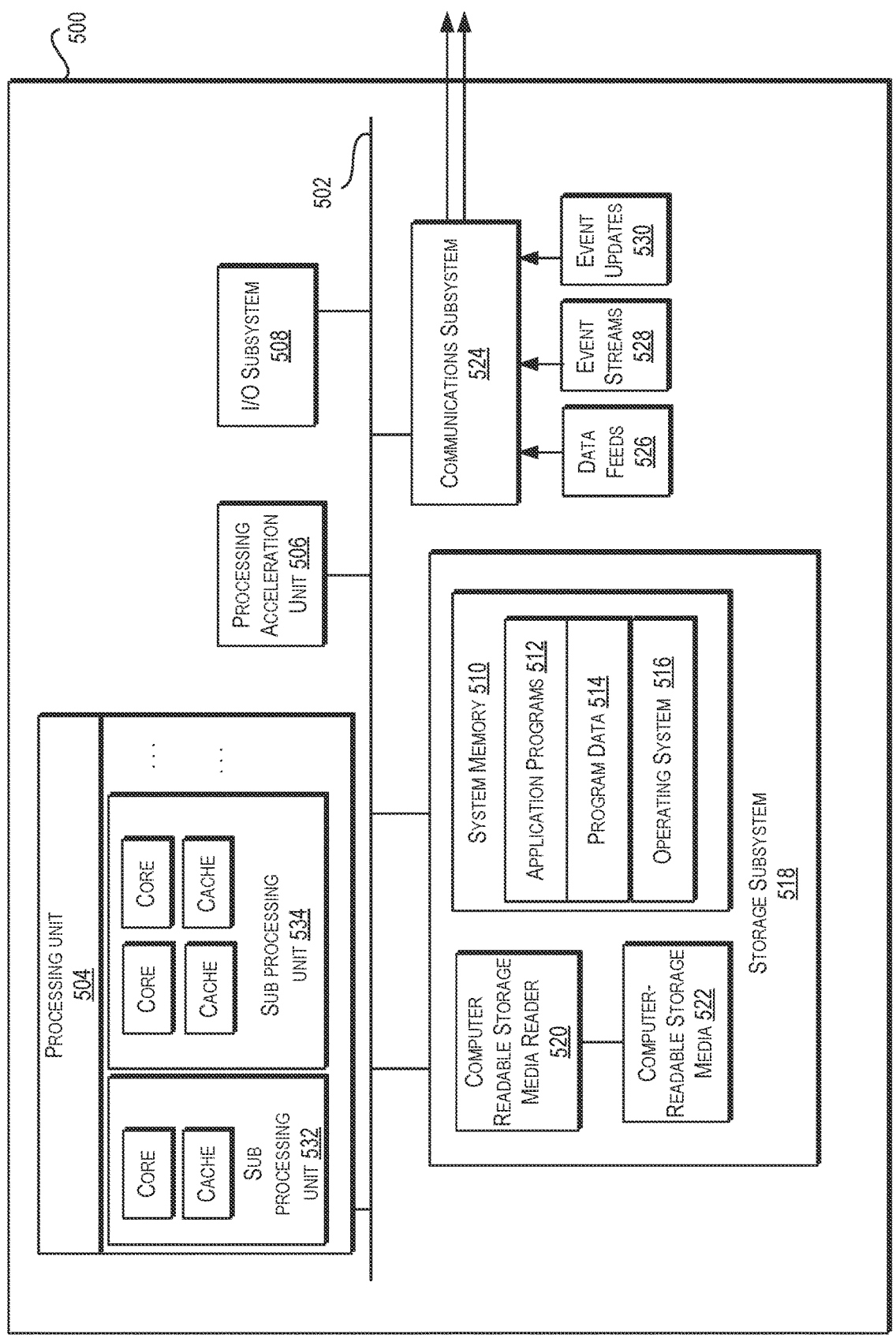
FIG. 5 is a block diagram illustrating an example computer system, according to at least one embodiment.

FIG. 5 illustrates an example computer system 500, in which various embodiments described herein may be implemented. The system 500 may be used to implement any of the computer systems described above. As shown in the figure, computer system 500 includes a processing unit 504 that communicates with a number of peripheral subsystems via a bus subsystem 502. These peripheral subsystems may include a processing acceleration unit 506, an input/output (I/O) subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processor(s) 504 and/or in storage subsystem 518. Through suitable programming, processor(s) 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions that are loadable and executable by processing unit 504. System memory 510 may also store data that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Access Control

As noted above, data resource stored in a cloud-based object storage system may include confidential or otherwise restricted information. Access controls implemented by the storage system may restrict access to the data resource based on an identity of a user requesting access. Accordingly, in a situation where a portion of the data resource needs to be accessed by a user not currently authorized to access the data resource, a separate data resource may be created including the desired portion of the original data resource, wherein the user is granted access to this separate data resource. This solution wastes computing resources (e.g., data storage resources) as data is duplicated between the original data resource and the separate data resource.

Figure 6:
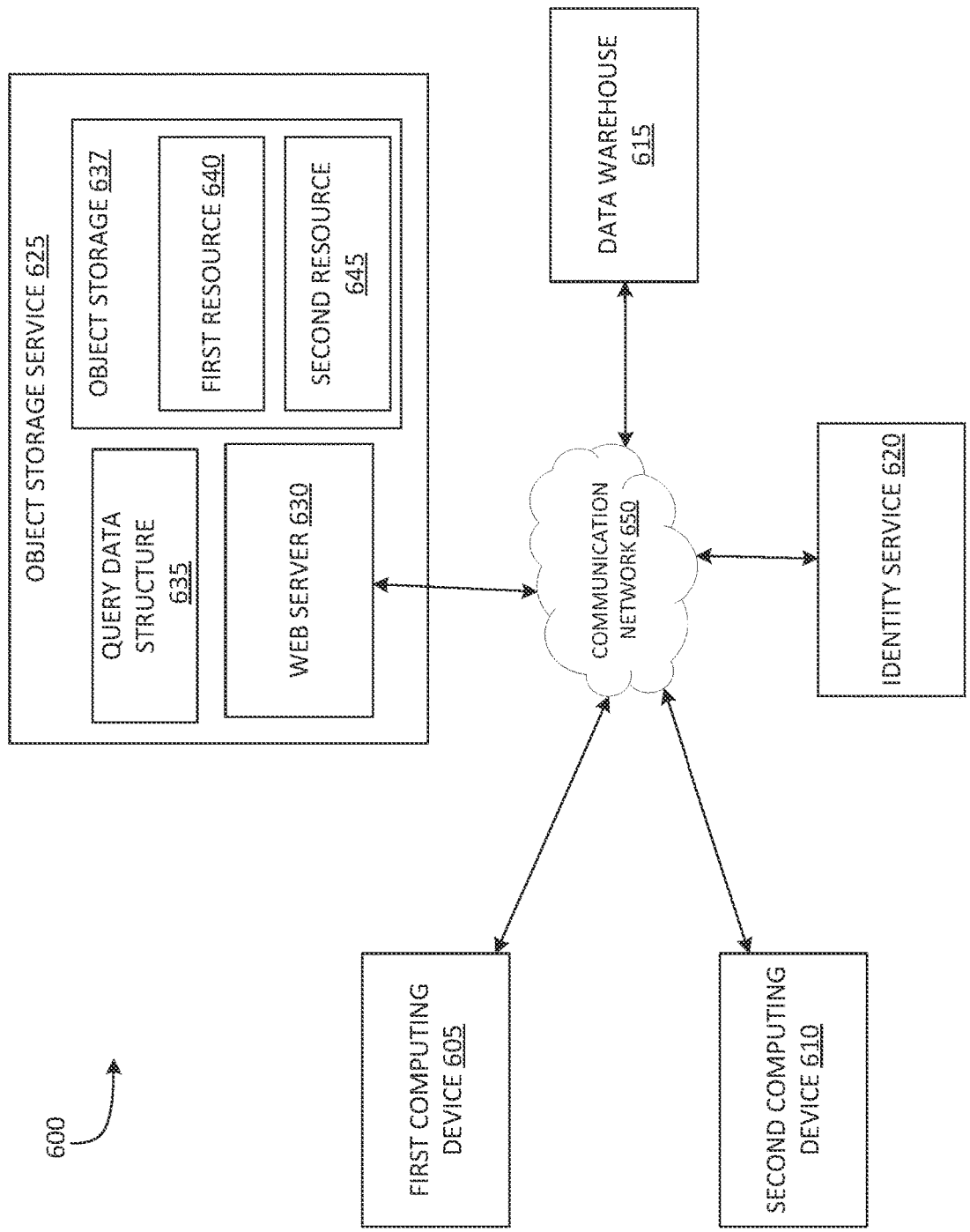
FIG. 6 schematically illustrates a system for controlling access to data, according to some embodiments.

To solve these and other technological difficulties, FIG. 6 illustrates a system 600 for controlling access to data. More specifically, the system 600 allows access to data to be controlled using a uniform resource locator (URL) associated with a query. The system 600 includes a first computing device 605, a second computing device 610, a data warehouse 615, an identity service 620, and an object storage service 625.

In some embodiments, the first computing device 605 and the second computing device 610 are client devices similar to the client devices described above in relation to FIG. 1. It should be understood that while the first computing device 605 and the second computing device 610 are the only user devices illustrated in FIG. 6, the system 600 may include more user devices than the first computing device 605 and the second computing device 610.

The identity service 620 may include one or more electronic computing devices that work together to prevent unauthorized users from accessing and allowing others to access data that is stored in the object storage service 625. The data warehouse 615 is a web application that communicates with the web server 630 via one or more APIs and generates a URL associated with a query.

In some embodiments, the object storage service 625 is a scalable, programmable, and durable cloud storage service. In some embodiments, the object storage service 625 is implemented using one or more components including a web server 630, a query data structure 635, and object storage 637. In some embodiments, object storage 637 is a durable, highly available, and secure user data storage backend infrastructure. It should be understood that the object storage service 625 may include other components in addition to or instead of the components described and illustrated herein and the functionality described herein as being performed by a single component included in the object storage service may be performed by multiple components in the object storage service 625.

In some embodiments, the web server 630, the first computing device 605, the second computing device 610, the identity service 620, and the data warehouse 615 communicate via the communication network 650. The communication network 650 may include one or more wired or wireless connections which allow the web server 630, the first computing device 605, the second computing device 610, the identity service 620, and the data warehouse 615 to communicate. In some embodiments, the web server 630, the first computing device 605, the second computing device 610, the identity service 620, and the data warehouse 615 may communicate through one or more intermediary devices that are not illustrated in FIG. 6.

In some embodiments, object storage 637 stores the first resource 640 and the second resource 645. The first resource 640 and the second resource 645 may include data that is stored in the object storage service 625 by one or more clients or users of the object storage service 625. The first resource 640 and the second resource 645 may be stored in a hierarchical container system and may each be associated with an object name, a bucket name, and a namespace. In some embodiments, first resource 640 and the second resource 645 can be identified or located in the object storage 637 using a combination of object name, bucket name, and namespace. In some embodiments, an object is the smallest unit of storage in the hierarchical container system. A bucket contains one or more objects (for example, a bucket may contain hundreds or billions of objects). A namespace may include one or more buckets. In some embodiments, customers can create one or more tenancies or namespaces at the OCI level. Creating multiple namespaces allows customers to provide different access to resources to different subgroups within the customers' organizations.

In some embodiments, the first resource 640 and the second resource 645 can be queried. While the first resource 640 and the second resource 645 are the only resources illustrated in FIG. 6 as being included in the object storage 637, the object storage 637 may include more resources than the two resources illustrated in FIG. 6. In some embodiments, the resources included in the object storage 637 is included in a data lake.

Figure 7:
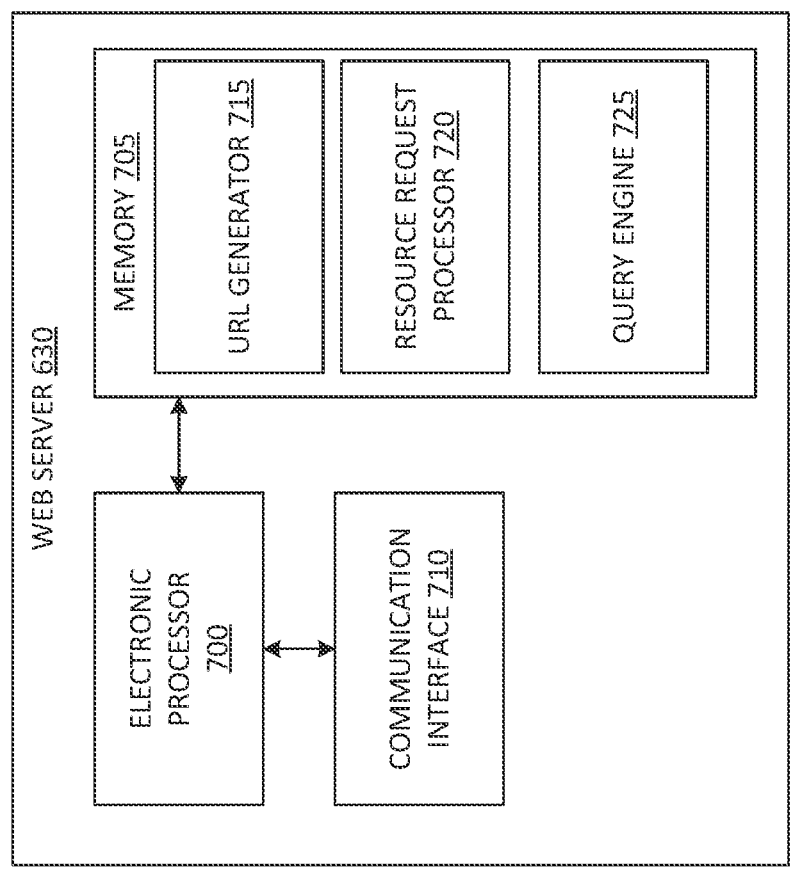
FIG. 7 schematically illustrates a web server included in the system of FIG. 6, according to some embodiments.

FIG. 7 illustrates components of the web server 630. In some embodiments, the web server 630 includes an electronic processor 700, a memory 705, and a communication interface 710. The electronic processor 700 may be implemented as one or more integrated circuits (for example, a microprocessor or microcontroller). In some embodiments, the electronic processor 700 may be a single or multicore processor. In some embodiments, the functionality described herein as being performed by the electronic processor 700 may, in fact, be performed by multiple electronic processors included in the web server 630.

The memory 705 may be a tangible non-transitory computer-readable storage medium for storing software that provides the functionality of the embodiments described in this disclosure. The software may include machine executable instructions (for example, programs, code modules, instructions, scripts, etc.) that, when executed by the electronic processor 700, cause the electronic processor 700 to perform the functionality described herein. In the example illustrated in FIG. 7, the memory 705 includes a URL generator 715, a resource request processor 720, and a query engine 725. The functionality performed by the electronic processor 700 when the electronic processor 700 executes the URL generator 715, the resource request processor 720, and the query engine 725 is described below in detail in relation to FIG. 9. It should be understood that, in some embodiments, the query engine 725 is included in the memory of a component included in the object storage service 625 other than the web server 630, and the functionally described herein as being performed when the electronic processor 700 included in the web server 630 executes the query engine 725, may instead be performed when an electronic processor included in the other component included in the object storage service 625 executes the query engine 725.

The communication interface 710 allows the web server 630 to receive data from and transmit data to electronic devices connected to the communication network 650 (for example, the first computing device 605, the second computing device 610, an electronic device involved in performing the functionality of the identity service 620, and an electronic device involved in implementing the data warehouse 615). For example, the communication interface 710 may enable the web server 630 to connect to one or more electronic devices via the Internet. In some embodiments, the communication interface 710 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communication interface 710 can provide wired network connectivity (e.g., Ethernet) in addition to or instead of a wireless interface.

The communication interface 710 may also allow the web server 630 to communicate with other components of the object storage service 625 (for example, the query data structure 635 and the object storage 637). In some embodiments, the web server 630 may communicate with other components included in the object storage service 625 via the one or more communications included in the communication network 650. In other embodiments, the web server 630 may communicate with other components included in the object storage service 625 via a communication network (not illustrated) that includes one or more wired or wireless connections and is private to the components included in the object storage service 625 (in other words, a communication network which only components included in the object storage service 625 are allowed to connect to).

Figure 8:
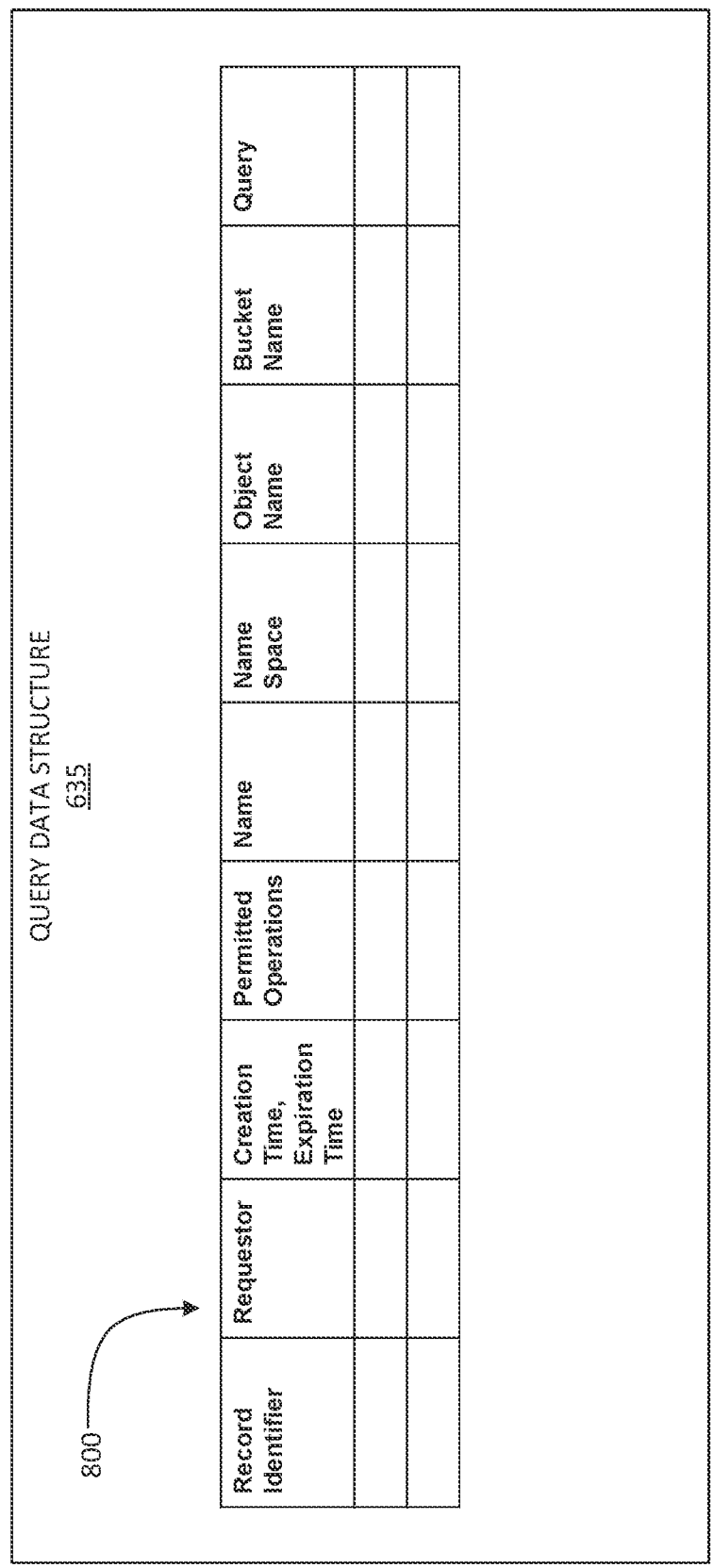
FIG. 8 illustrates information included in a query data structure used by the system of FIG. 6, according to some embodiments.

FIG. 8 illustrates information included in a query data structure 635, which may be a database storing a plurality of data records or other type of index. For example, in some embodiments, the plurality of data records included in the query data structure 635 are included in an index 800. Each data record included in the query data structure 635 is associated with or corresponds to a URL and may include a record identifier, a requestor identifier, a creation time, an expiration time, one or more permitted operations, a name, a namespace, an object name, a bucket name, a query, a combination of the foregoing, and the like. The record identifier may be a hash of a nonce included in a URL that a data record is associated with. The requestor identifier may be a unique identifier associated with or corresponding to a user that requested the creation or generation of a URL that a data record is associated with. The creation time may be a time at which a URL associated with a data record is created by the electronic processor 700. The expiration time may specify a day and time until which the URL associated with the data record may be used to access data stored included in the object storage service 625.

Permitted operations may be actions that a user with access to the URL associated with the data record is allowed to take with regards to the data in the object storage service 625 that the URL allows the user access to. For example, permitted operations may include the ability to view data included in a resource (read), the ability to edit data included in and add data to a resource (write), the ability to view and edit data in and add data to a resource (read and write), and the like.

The namespace, object name, and bucket name define a resource (for example, the first resource 640 or the second resource 645) included in the object storage service 625 that a URL associated with a data record gives users access to. In some embodiments, a resource need not be identified by each of a namespace, an object name, and a bucket name. For example, in the case that a resource is a bucket including a plurality of objects, the resource may be defined by a namespace and a bucket name. The query is a query that, when executed, causes data from a resource defined by a namespace, an object name, and a bucket name included in a data record to be returned. In other words, a query defines data included in a resource defined by a namespace, an object name, and a bucket name that a user has access to when the user has access to the URL.

It should be understood that every data record included in the query data structure 635 does not necessarily include a record identifier, a requestor identifier, a creation time, an expiration time, one or more permitted operations, a name, a namespace, an object name, a bucket name, and a query.

For example, a data record may not include an expiration time and a URL associated with the data record that does not include an expiration time may allow a user access to data specified by the data record indefinitely.

In one example embodiment, a first data record included in the plurality of data records references the first resource 640, a first user, and a first query and a second data record included in the plurality of data records references the first resource 640, the first user, and a second query that is different from the first query.

Figure 11:
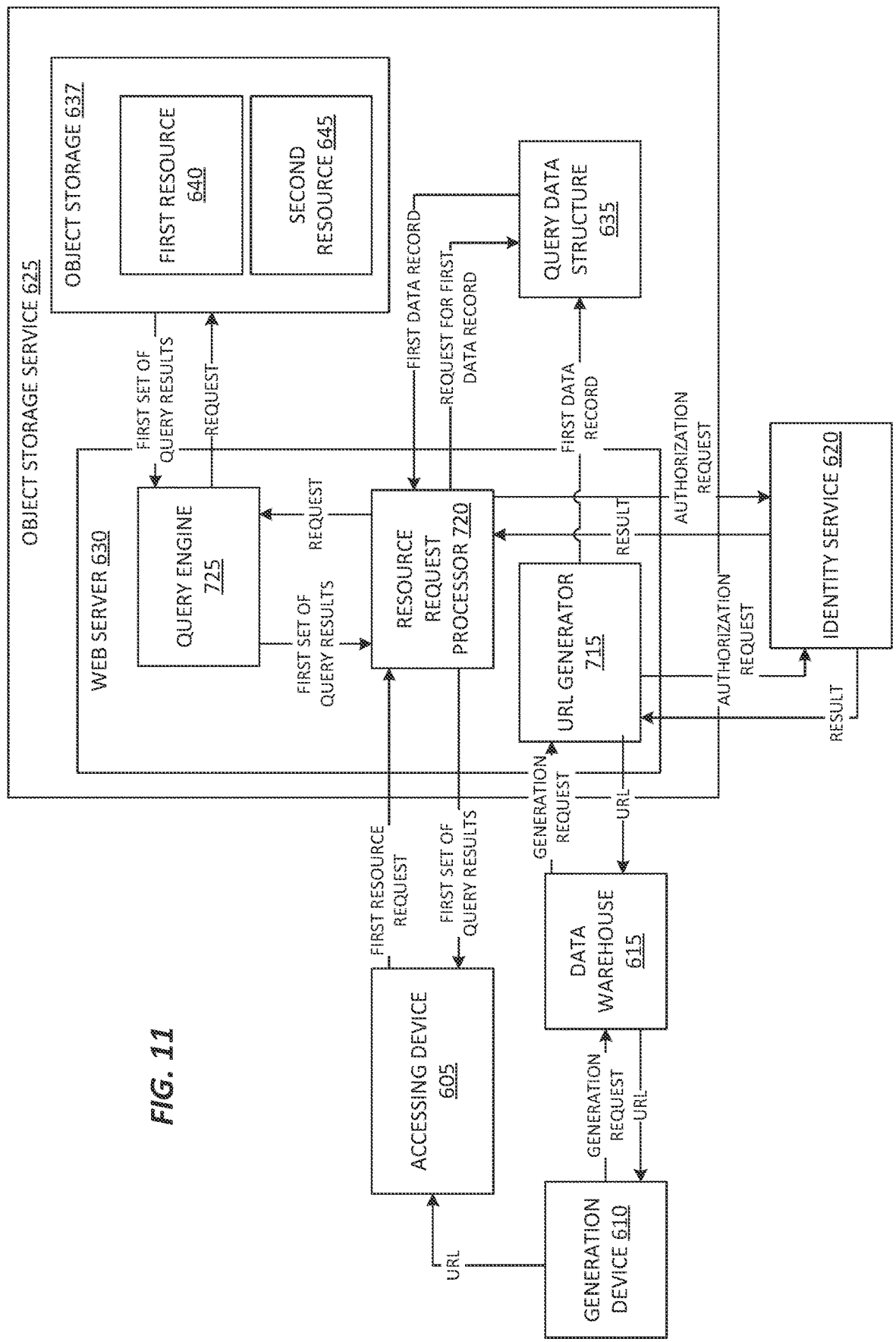
FIG. 11 schematically illustrates a flow of communications between the components of the system of FIG. 6, according to some embodiments.

FIG. 9 is a flowchart illustrating a method 900 for controlling access to data. The method 900 is described as being performed via the web server 630, such as, for example, via the electronic processor 700 (through execution of one or more software modules by the electronic processor 700). For example, FIG. 11 illustrates a flow of communications between the components of the system 600 as the method 900 is performed.

Figure 10A:
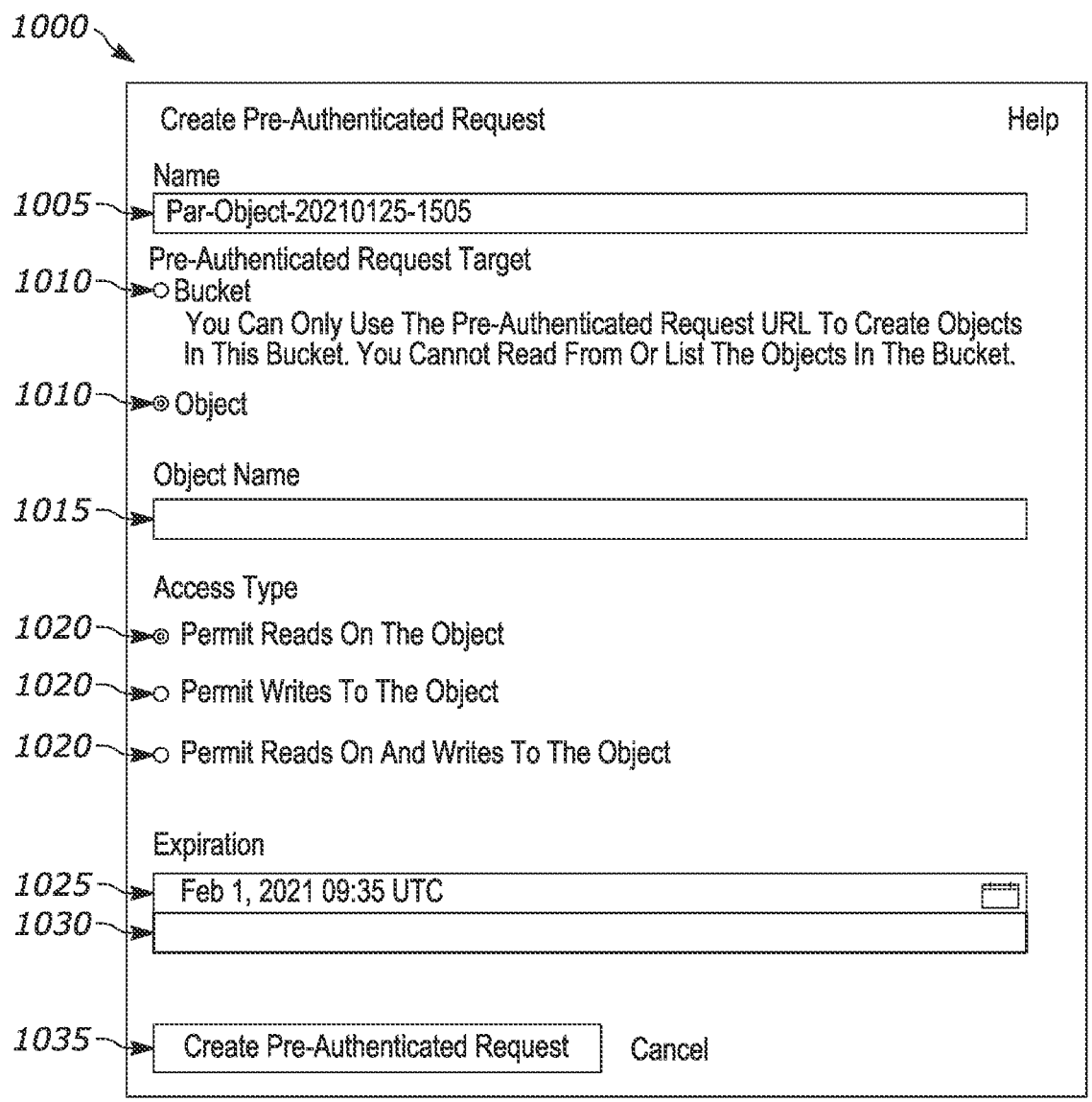
FIG. 10A illustrates a user interface for generating a URL associated with a query, according to some embodiments.

As illustrated in FIG. 9, the method 900 includes receiving, with the electronic processor 700, a generation request from a computing device, which may be the second computing device 610 as described above (at block 905). The second computing device 610 may also be referred to herein as the "generation device 610" as this device is used to request the generation of a URL as described herein. The generation request is associated with or otherwise identified as being requested by the first user (e.g., based on log-in or session data establishing the first user as submitting the generation request), and is a request to generate a URL for accessing query results responsive to executing a first query on a first resource (for example, the first resource 640). In some embodiments, the generation device 610 may be configured to display the example user interface 1000 illustrated in FIG. 10A and receive, through the user interface 1000, one or more inputs for a generation request. The user interface 1000 includes various input mechanisms for receiving an identifier of the first resource 640 (e.g., a name, such as, for example, text field 1005 illustrated in FIG. 10A), receiving a selection of a bucket or object (e.g., using radio buttons 1010), and receiving (e.g., depending on which of the radio buttons 1010 was selected), an object name or a bucket name (e.g., via a text field 1015 as illustrated in FIG. 10A). In some embodiments, the user interface 1000 also includes one or more radio buttons 1020 defining operations that users that have access to the URL are allowed to perform (e.g., permit reads, permit writes, or permit reads and writes). In some embodiments, the user interface 1000 also includes an input mechanism (e.g., input field 1025 illustrated in FIG. 10) for receiving an expiration date for the URL. In response to receiving an access request associated with the generated URL after the expiration date, the access requested may be denied.

Figure 10B:
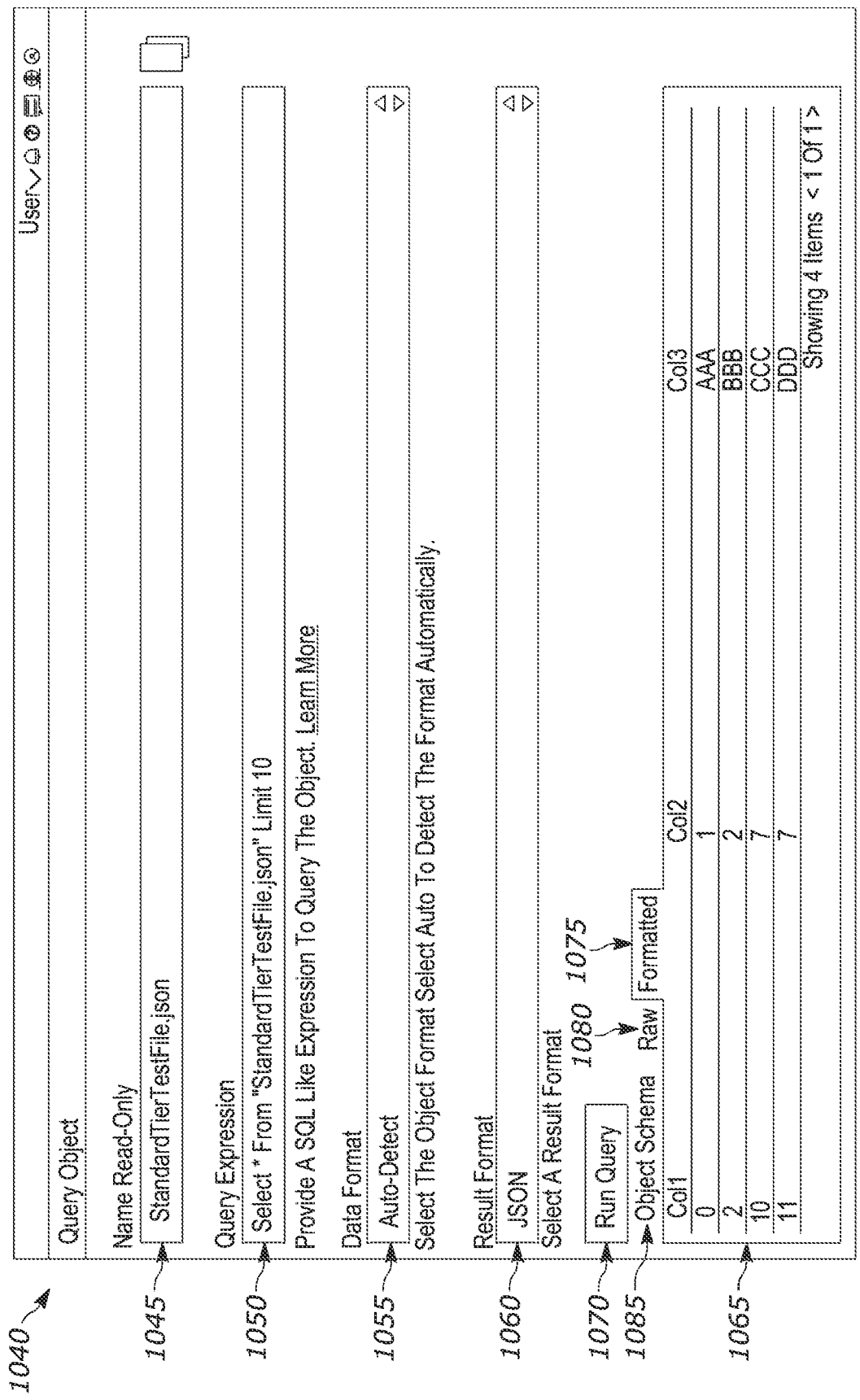
FIG. 10B illustrates a user interface for defining a query associated with a URL, according to some embodiments.

As illustrated in FIG. 10A, the user interface 1000 also includes an input mechanism 1030 for receiving the first query to be executed on the first resource. The input mechanism 1030 may be a text field, one or more drop down menus for building a query from available query components (e.g., column and/or field selections, tables, conditions, groupings, etc.). In some embodiments, available components (e.g., tables, columns, etc.) may be dynamically generated as part of the user interface 1000 based on other inputs (e.g., the first resource). Alternatively or in addition, the user interface 1000 may include a mechanism selectable by user to access a separate user interface for defining the query, which may be a user interface similar to how a user defines queries separate from generating a shareable link. FIG. 10B illustrates one example of such a user interface 1040 for defining the query. In the user interface 1040, the text field 1045 defines the object that the query will be run on. In some embodiments, the text field 1045 may be auto populated with an object name based on a selection of an object by a user. For example, a user may select an object to query from a list of possible objects to query. The interface 1040 also includes an input mechanism 1050 for receiving the first query to be executed on the first resource. The input mechanism 1050 illustrated in FIG. 10B is a text field, however, in alternative embodiments, the input mechanism 1050 may be one or more drop down menus for building a query from available query components (e.g., column and/or field selections, tables, conditions, groupings, etc.). The user interface 1040 further includes an input mechanism 1055 for receiving a data format associated with the object specified in the text field 1045. In some implementations, the input mechanism 1055 is a dropdown menu from which a data format associated with an object may be selected. In some embodiments, a selection to automatically determine the format of the object specified in the text field 1045 may be received via the input mechanism 1055. The user interface 1040 further includes an input mechanism 1060 for receiving a data format for the first set of query results generated when the first query is executed. In some implementations, the input mechanism 1060 is a dropdown menu from which a data format for the first set of query results may be selected. In some implementations, a first set of query results may be displayed in a pane 1065 in the user interface 1040 when a selection of an input mechanism (for example, the button 1070) is received. In some implementations, the user interface 1040 may include one or more tabs which, when selected, display a pane including the first set of query results or a schema of the object defined in the text field 1045. For example, when a selection of the first tab 1075 is received, the pane 1065 including the first set of query results formatted in accordance with the data format received via the input mechanism 1060 is displayed. In another example, when a selection of a second tab 1080 is received, a pane including the first set of query results in a raw or unformatted manner is displayed. When a third tab 1085 is selected, a schema of the object defined in the text field 1045 is displayed.

Returning to FIG. 10A, the user interface 1000 may also include a selection mechanism (e.g., button 1035) for sending a generation request to the web server 630 based on the inputs received through the user interface 1000, stored configurations, or a combination thereof. As illustrated in FIG. 11, in some embodiments, the generation device 610 sends a generation request to the web server 630 via the data warehouse 615 and, in particular, may send the generation request to a URL generator 715 executed by the electronic processor 700 of the web server 630.

In response to receiving the generation request from the generation device 610, the electronic processor 700 verifies the access rights of the first user requesting the generation request (at block 910). As illustrated in FIG. 11, in some embodiments, the electronic processor 700 verifies the access rights of the first user by transmitting an authorization request to the identity service 620. The authorization request identifies the first user, the first resource, and, optionally, other data associated with the generation request, and the identity service 620 uses this information to determine the first user has permission to access the first resource 640. As illustrated in FIG. 11, in some embodiments, the identity service 620 may be located on and executed by one or more electronic computing devices outside of the object storage service 625. The identity service 620 may return a result or a response to the authorization request (e.g., to the URL generator 715) indicating whether the first user has access rights to the first resource 640. In response to the first user not having permission to access the first resource 640, the electronic processor 700 may send a message to the generation device 610 indicating that URL generation failed due to the first user having insufficient access rights to the first resource 640 and, as illustrated in FIG. 9, the method 900 may end.

Alternatively, in response to receiving a response from the identity service 620 that the first user has access rights to the first resource 640 (at block 910), the electronic processor 700 generates the requested URL and stores a first data record referencing the URL, the first user, the first resource, and the first query (at block 915). In some embodiments, to generate the URL, the electronic processor 700 generates a nonce (for example, a randomly generated 384-bit value) that is included in the URL. In addition to the nonce, the URL may include identifiers of the namespace, bucket name, and/or object name defining the first resource 640, or a combination thereof. For example, in some embodiments, the URL may be structured in the following manner: https:// objectstorage.region.oraclecloud.com/p/nonce/n/ namespace/b/bucket/o/object.

As described with respect to FIG. 8, the first data record may be stored in the query data structure 635 and may include the object name and the bucket name that define the first resource 640; the first query; a unique identifier associated with the first user (a requestor identifier representing who requested creation of the URL and who was verified as having access to the first resource at the creation time of the URL); a record identifier (in some embodiments, the nonce or a hash of the nonce included in the URL); the permitted operations; the expiration date; or a combination thereof.

In some embodiments, the electronic processor 700 sends the generated URL to the generation device 610 as a response to the generation request. For example, as illustrated in FIG. 11, the electronic processor 700, while executing the URL generator 715, may generate the URL corresponding to the first data record and send the URL to the generation device 610, such as, for example, via the data warehouse 615. In some embodiments, the URL is a sharable link that the first user is able to share with other users. For example, as shown in FIG. 11, in response to input from the first user, the generation device 610 may send (e.g., via email, text, instant message, chat, etc.) the URL to another computing device, such as, for example, the first computing device 605, which may use the received URL to access data. The computing device receiving and using the URL (i.e., the first computing device 605) may also be referred to herein as the "accessing device 605" used by a second user to access data associated with the URL. To access the URL, the URL may be entered into a search or address bar of a web browser running on the accessing device 605 (e.g., manually entered into the bar or automatically entered through a selection of the URL when the URL is provided as a hyperlink).

For example, as illustrated in FIG. 9, in some embodiments, the electronic processor 700 receives a first resource request from the accessing device 605 using the URL (at block 920). As illustrated in FIG. 11, in some embodiments, the first resource request is received by the resource request processor 720 as executed by the electronic processor 700. In response to receiving the first resource request, the electronic processor 700 identifies the first data record from a plurality of data records corresponding to the URL (at block 925). In some embodiments, the electronic processor 700 identifies the first data record by identifying the nonce included in the URL and determining a record identifier based on the nonce. Alternatively or in addition, the electronic processor 700 may determine a record identifier based on the first resource identified from the URL or other data or combinations of data included in the URL. In some embodiments, the electronic processor 700 uses the determined record identifier to look up an index 800 of the plurality of data records to identify the first data record. For example, the index 800 may include a plurality of record identifiers, wherein each respective record identifier corresponds to one of the plurality of data records. The index 800 may included in the query data structure 635.

Based on the retrieved first data record, the electronic processor 700 may identify an expiration time corresponding to the URL. In response to the expiration time having passed, the electronic processor 700 may send a notification to the accessing device 605 indicating that the first resource request failed because the URL is expired and the method 900 may end.

Based on the retrieved first data record, the electronic processor 700 also identifies the first resource and the first user (at block 930) and verifies that the first user has access rights to the first resource (at block 935). Because the electronic processor 700 determines the access rights of the first user (whose access rights were also verified when the URL was generated) rather than the access rights of the second user using the URL, the URL can be described as including a pre-authenticated shareable link. In other words, regardless of whether the second user has access rights to the first resource 640, access to the data associated with the URL is provided to the accessing device 605 as long as the first user who requested the generation of the URL has access rights to the first resource 640 at the time the URL is used.

In some embodiments, the electronic processor 700 verifies the access rights of the first user (at block 935) as described above with respect to generation of the URL (see, e.g., block 910). For example, the electronic processor 700 may verify the access rights using the identity service 620. In response to determining that the first user does not have access rights to the first resource 640, the electronic processor 700 refrains from transmitting data associated with the URL to the accessing device 605 and, in some embodiments, the electronic processor 700 may send a message to the accessing device 605 indicating that the first resource request failed due to the first user having insufficient access rights to the first resource 640.

Alternatively, in response to verifying that the first user has access rights to the first resource 640, the electronic processor 700 executes the first query identified from the first data record on the first resource 640 to generate a first set of query results (at block 940). As illustrated in FIG. 11, in some embodiments, the resource request processor 720 executes the first query by transmitting a request to the object storage 637, such as, for example, through the query engine 725. The request may include the object name, the bucket name, and a namespace identifying the first resource 640 and the first query. The first set of query results are communicated from the object storage 637 to the resource request processor 720 via the query engine 725 and include a first subset of data from the first resource 640, which may represent only a portion of the data included in the first resource 640 such that a second subset of data from the first resource 640 is not included in the first set of query.

As illustrated in FIG. 9, the electronic processor 700 transmits the first set of query results to the accessing device 605 (at block 945). The accessing device 605 may display the first set of query results within a user interface, allow the second user to edit the first set of query results, add data to the first set of query results, a combination of thereof. For example, the second user's permissions regarding the first set of query results may be controlled based on the permissions specified as part of the original URL generation request, which may be stored in the first data record and enforced via the accessing device 605, the web server 630, or a combination thereof.

It should be understood that while the URL generator 715, the resource request processor 720, and the query engine 725 are each described in relation to FIG. 11 as being executed by the electronic processor 700, the URL generator 715, the resource request processor 720, and the query engine 725 may be executed by multiple electronic processors. For example, a first electronic processor may execute the URL generator 715, a second electronic processor may execute the resource request processor 720, and a third electronic processor may execute the query engine 725.

As the query (as stored in the respective data record for a URL) is executed on the resource when the URL is used, rather than sharing the URL as a way to access static data, the shared URL can be used to access (subject to the specified query associated with the URL) a current version of data. For example, as one example, the electronic processor 700 may receive from the accessing device 605 or another (e.g., third computing device (not illustrated herein)) different from the first computing device 605 and the second computing device 610), a second resource request using the URL. The second resource request may be received at a time after the electronic processor 700 transmitted the first set of query results to the accessing device 605, wherein the first resource 640 was modified (e.g., data was deleted, data was added, data was modified, or a combination thereof) in the time between the electronic processor 700 transmitting the first set of query results to the accessing device 605 and the electronic processor 700 receiving the second resource request. In response to receiving the second resource request, the electronic processor 700 identifies the first data record corresponding to the URL from the plurality of data records, identifies, from the first data record corresponding to the URL, the first resource 640 and the first user, and verifies the access rights of the first user to the first resource 640 as generally described above with respect to the method 900. In response to verifying the access rights of the first user to the first resource 640, the electronic processor 700 executes the first query identified from the first data record on the first resource 640 to generate a second set of query results and transmits the second set of query results to the accessing device 605 (or a third computing device in situations where the second resource request was received from a third computing device. In this implementation, the first set of query results and the second set of query results are different due to the first resource 640 being modified in the time between the electronic processor 700 transmitting the first set of query results and receiving the second resource request. Accordingly, by storing the query as part of the data record associated with the URL and executing the query on the data at the time the URL is used, embodiments described herein not only provide data access control but provide such control in a non-static manner to ensure proper and up-to-date data is provided in response to data requests in an efficient manner (e.g., without requiring the creation and sharing of a new URL for each data modification). In other words, embodiments described herein restrict access to data from a data resource (e.g., a file) in real-time through application of a stored query associated with a shared link.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

One example embodiment described herein provides a system for controlling access to data. The system includes at least one electronic processor that is configured to receive, from a first computing device, a first resource request using a uniform resource locator (URL) and identify a first data record, from a plurality of data records, corresponding to the URL. Each of the plurality of data records references a respective resource, a respective user, and a respective query. The electronic processor is also configured to identify, from the first data record corresponding to the URL, a first resource and a first user and verify access rights of the first user identified from the first data record to the first resource identified from the first data record. The electronic processor is further configured to, in response to verifying the access rights of the first user to the first resource, execute a first query identified from the first data record on the first resource to generate a first set of query results and transmit, to the first computing device, the first set of query results.

In some aspects, the electronic processor is further configured to receive, from a second computing device, a second resource request using the URL and identify the first data record, from the plurality of data records, corresponding to the URL. The electronic processor is also configured to identify, from the first data record corresponding to the URL, the first resource and the first user and verify access rights of the first user identified from the first data record to the first resource identified from the first data record. Further the electronic processor is configured to, in response to verifying the access rights of the first user to the first resource, execute the first query identified from the first data record on the first resource to generate a second set of query results, wherein the first set of query results and the second set of query results are different, and transmit, to the second computing device, the second set of query results.

In some aspects, the electronic processor is further configured to receive, from a second computing device, a second resource request using the URL and identify the first data record, from the plurality of data records, corresponding to the URL. The electronic processor is also configured to identify, from the first data record corresponding to the URL, the first resource and the first user and verify access rights of the first user identified from the first data record to the first resource identified from the first data record. The electronic processor is configured to, in response to determining that the first user does not have access rights to the first resource, refrain from transmitting, to the second computing device, any data from the first resource responsive to the second resource request.

In some aspects, identifying the first data record, from the plurality of data records, corresponding to the URL includes identifying, from the URL, a nonce, determining a record identifier based at least on the nonce identified from the URL, and looking up an index of the plurality of data records using the record identifier to identify the first data record from the plurality of data records, wherein the index comprises a plurality of record identifiers corresponding to the plurality of data records.

In some aspects, the record identifier is further determined based on the first resource identified from the URL.

In some aspects, the first resource is identified from the first data record based on a bucket name and an object name included in the first data record.

In some aspects, the first user is a user who (a) requested creation of the URL corresponding to the first data record and (b) had access rights to the first resource at a creation time of the URL.

In some aspects, the first resource request is requested by a second user who does not have access rights to the first resource.

In some aspects, the first computing device is operated by a second user different than the first user and the second user does not have access rights to the first resource.

In some aspects, verifying access rights of the first user identified from the first data record to the first resource identified from the first data record includes transmitting, to an identity service, an authorization request to verify the access rights of the first user to the first resource and receiving, from the identity service, a response indicating that the first user has the access rights to the first resource.

In some aspects, the first set of query results comprises a first subset of data from the first resource, and a second subset of data from a second resource is not transmitted to the first computing device responsive to the first resource request.

In some aspects, the URL comprises a pre-authenticated shareable link.

In some aspects, the URL comprises a shareable link.

In some aspects, a second data record from the plurality of data records references the first resource, the first user, and a second query different from the first query.

In some aspects, the electronic processor is further configured to receive, from a second computing device, a generation request requested by the first user to generate the URL for accessing query results responsive to executing the first query on the first resource and verify access rights of the first user requesting the generation request. The electronic processor is also configured to, in response to verifying the access rights of the first user to the first resource, generate the first data record referencing the first user, the first resource, and the first query.

In some aspects, the first query is executed by an object storage service.

In some aspects, the first query is executed by a web server associated with an object storage service.

Another example embodiment described herein provides method for controlling access to data. The method includes receiving, from a first computing device, a first resource request using a sharable link and identifying a first data record, from a plurality of data records, corresponding to the sharable link. Each of the plurality of data records references a respective resource, a respective user, and a respective query. The method also includes identifying, from the first data record corresponding to the sharable link, a first resource and a first user and verifying access rights of the first user identified from the first data record to the first resource identified from the first data record. The method further includes, in response to verifying the access rights of the first user to the first resource, executing a first query identified from the first data record on the first resource to generate a first set of query results and transmitting, to the first computing device, the first set of query results.

Yet another example embodiment described herein provides a non-transitory computer-readable medium comprising executable instructions that, when executed by an electronic processor, cause the electronic processor to perform a set of functions. The set of functions include receiving, from a first computing device, a first resource request using a URL and identifying a first data record, from a plurality of data records, corresponding to the URL. Each of the plurality of data records references a respective resource, a respective user, and a respective query. The set of functions also include identifying, from the first data record corresponding to the URL, a first resource and a first user and verifying access rights of the first user identified from the first data record to the first resource identified from the first data record. The set of functions further include, in response to verifying the access rights of the first user to the first resource, executing a first query identified from the first data record on the first resource to generate a first set of query results and transmitting, to the first computing device, the first set of query results.

What is claimed is:

1. A system for controlling access to data, the system comprising:
  at least one electronic processor configured to:
    receive, from a first computing device, a first resource request using a uniform resource locator (URL);
    identify a first data record, from a plurality of data records, corresponding to the URL, wherein each of the plurality of data records references a respective resource, a respective user, and a respective query;
    identify, from the first data record corresponding to the URL, a first resource and a first user;
    verify access rights of the first user identified from the first data record to the first resource identified from the first data record; and
    in response to verifying the access rights of the first user to the first resource:
      execute a first query identified from the first data record on the first resource to generate a first set of query results; and
      transmit, to the first computing device, the first set of query results.

2. The system according to claim 1, wherein the at least one electronic processor is further configured to:
  receive, from a second computing device, a second resource request using the URL;
  identify the first data record, from the plurality of data records, corresponding to the URL;
  identify, from the first data record corresponding to the URL, the first resource and the first user;
  verify access rights of the first user identified from the first data record to the first resource identified from the first data record; and
  in response to verifying the access rights of the first user to the first resource:
    execute the first query identified from the first data record on the first resource to generate a second set of query results, wherein the first set of query results and the second set of query results are different; and
    transmit, to the second computing device, the second set of query results.

3. The system according to claim 1, wherein the at least one electronic processor is further configured to:
  receive, from a second computing device, a second resource request using the URL;
  identify the first data record, from the plurality of data records, corresponding to the URL;
  identify, from the first data record corresponding to the URL, the first resource and the first user;
  verify access rights of the first user identified from the first data record to the first resource identified from the first data record; and
  in response to determining that the first user does not have access rights to the first resource:
    refrain from transmitting, to the second computing device, any data from the first resource responsive to the second resource request.

4. The system according to claim 1, wherein identifying the first data record, from the plurality of data records, corresponding to the URL comprises:
  identifying, from the URL, a nonce;
  determining a record identifier based at least on the nonce identified from the URL; and
  looking up an index of the plurality of data records using the record identifier to identify the first data record from the plurality of data records, wherein the index comprises a plurality of record identifiers corresponding to the plurality of data records.

5. The system according to claim 4, wherein the record identifier is further determined based on the first resource identified from the URL.

6. The system according to claim 1, wherein the first resource is identified from the first data record based on a bucket name and an object name included in the first data record.

7. The system according to claim 1, wherein the first user is a user who (a) requested creation of the URL corresponding to the first data record and (b) had access rights to the first resource at a creation time of the URL.

8. The system according to claim 7, wherein the first resource request is requested by a second user who does not have access rights to the first resource.

9. The system according to claim 1, wherein the first computing device is operated by a second user different than the first user and the second user does not have access rights to the first resource.

10. The system according to claim 1, wherein verifying access rights of the first user identified from the first data record to the first resource identified from the first data record comprises:
- transmitting, to an identity service, an authorization request to verify the access rights of the first user to the first resource; and
- receiving, from the identity service, a response indicating that the first user has the access rights to the first resource.

11. The system according to claim 1, wherein the first set of query results comprises a first subset of data from the first resource, and a second subset of data from a second resource is not transmitted to the first computing device responsive to the first resource request.

12. The system according to claim 1, wherein the URL comprises a pre-authenticated shareable link.

13. The system according to claim 1, wherein the URL comprises a shareable link.

14. The system according to claim 1, wherein a second data record from the plurality of data records references the first resource, the first user, and a second query different from the first query.

15. The system according to claim 1, wherein the at least one electronic processor is further configured to:
- receive, from a second computing device, a generation request requested by the first user to generate the URL for accessing query results responsive to executing the first query on the first resource;
- verify access rights of the first user requesting the generation request; and
- in response to verifying the access rights of the first user to the first resource:
  - generate the first data record referencing the first user, the first resource, and the first query.

16. The system according to claim 1, wherein the first query is executed by an object storage service.

17. The system according to claim 1, wherein the first query is executed by a web server associated with an object storage service.

18. A method for controlling access to data, the method comprising:
- receiving, from a first computing device, a first resource request using a sharable link;
- identifying a first data record, from a plurality of data records, corresponding to the sharable link, wherein each of the plurality of data records references a respective resource, a respective user, and a respective query;
- identifying, from the first data record corresponding to the sharable link, a first resource and a first user;
- verifying access rights of the first user identified from the first data record to the first resource identified from the first data record; and
- in response to verifying the access rights of the first user to the first resource:
  - executing a first query identified from the first data record on the first resource to generate a first set of query results; and
  - transmitting, to the first computing device, the first set of query results.

19. A non-transitory computer-readable medium comprising executable instructions that, when executed by an electronic processor, cause the electronic processor to perform a set of functions comprising:
- receiving, from a first computing device, a first resource request using a URL;
- identifying a first data record, from a plurality of data records, corresponding to the URL, wherein each of the plurality of data records references a respective resource, a respective user, and a respective query;
- identifying, from the first data record corresponding to the URL, a first resource and a first user;
- verifying access rights of the first user identified from the first data record to the first resource identified from the first data record; and
- in response to verifying the access rights of the first user to the first resource:
  - executing a first query identified from the first data record on the first resource to generate a first set of query results; and
  - transmitting, to the first computing device, the first set of query results.

\* \* \* \* \*